(12) United States Patent
Yoshida et al.

(10) Patent No.: US 6,293,482 B1
(45) Date of Patent: Sep. 25, 2001

(54) METHOD AND APPARATUS FOR CUTTING STRAND

(75) Inventors: Minoru Yoshida; Yoshihito Tamaki; Minori Takata; Kunihiro Horie, all of Hiroshima (JP)

(73) Assignee: The Japan Steel Works, Ltd., Tokyo (JP)

( * ) Notice: Subject to any disclaimer, the term of this patent is extended or adjusted under 35 U.S.C. 154(b) by 0 days.

(21) Appl. No.: 09/448,831

(22) Filed: Nov. 24, 1999

(30) Foreign Application Priority Data

Nov. 24, 1998 (JP) .................................. 10-335084
Aug. 27, 1999 (JP) .................................. 11-241665

(51) Int. Cl.$^7$ .................................. B02C 18/16
(52) U.S. Cl. .................................. 241/238; 241/242
(58) Field of Search .................................. 425/142; 241/242, 241/286, 287, 288, 289, 290, 238

(56) References Cited

U.S. PATENT DOCUMENTS

| 2,841,341 | 7/1958 | Noble et al. |
| 3,315,368 | 4/1967 | Duby . |
| 3,910,510 | * 10/1975 | Danberg .................................. 241/238 |
| 4,123,207 | 10/1978 | Dudley . |
| 5,292,240 | 3/1994 | Capelle . |
| 5,587,186 | 12/1996 | Voigt . |

FOREIGN PATENT DOCUMENTS

| 2 345 310 | 3/1974 | (DE) .................................. B29F/3/00 |
| 0 418 941 | 3/1991 | (EP) . |
| 0 462 887 | 12/1991 | (EP) . |
| 0 687 535 | 12/1995 | (EP) . |
| 565 344 | 1/1924 | (FR) . |

* cited by examiner

Primary Examiner—Mark Rosenbaum
(74) Attorney, Agent, or Firm—Sughrue, Mion, Zinn, Macpeak & Seas, PLLC (57) ABSTRACT

A strand cutting apparatus includes a fixed blade 2 having a blade edge extending perpendicularly with respect to the traveling direction of a strand, and a rotation blade 3 which is fixed to the tip portion of a rotation shaft 13 extending perpendicularly to the blade edge of the fixed blade 2 and has a plurality of plate-shaped blades 15 disposed radially at a front surface 3a. The rotation shaft 13 is supported by a supporting member 14 through a bearing mechanism 30 so as to be freely rotatable. The supporting member 14 is opposed to the one side of the fixed blade 2 with a clearance therebetween. The supporting member 14 is guided by a pair of guide plates 39 so as to be movable freely and linearly along the same direction as the axial direction of the rotation shaft 13. The rotation blade 3 is moved linearly to this same direction together with the supporting member 14 to adjust a clearance between the blade edge 2a of the fixed blade 2 and the blade edges 15a of the plate-shaped blades 15, and then the supporting member can be fixed by using stop bolts 41.

13 Claims, 12 Drawing Sheets

METHOD AND APPARATUS FOR CUTTING STRAND

BACKGROUND OF THE INVENTION

1. Field of Invention

The present invention relates to a method and an apparatus for cutting a strand of a slide-cut system used in a plastics pellet manufacturing apparatus.

2. Related art

An example of a conventional strand cutting apparatus used in a pellet manufacturing apparatus will be explained.

Figure 13:
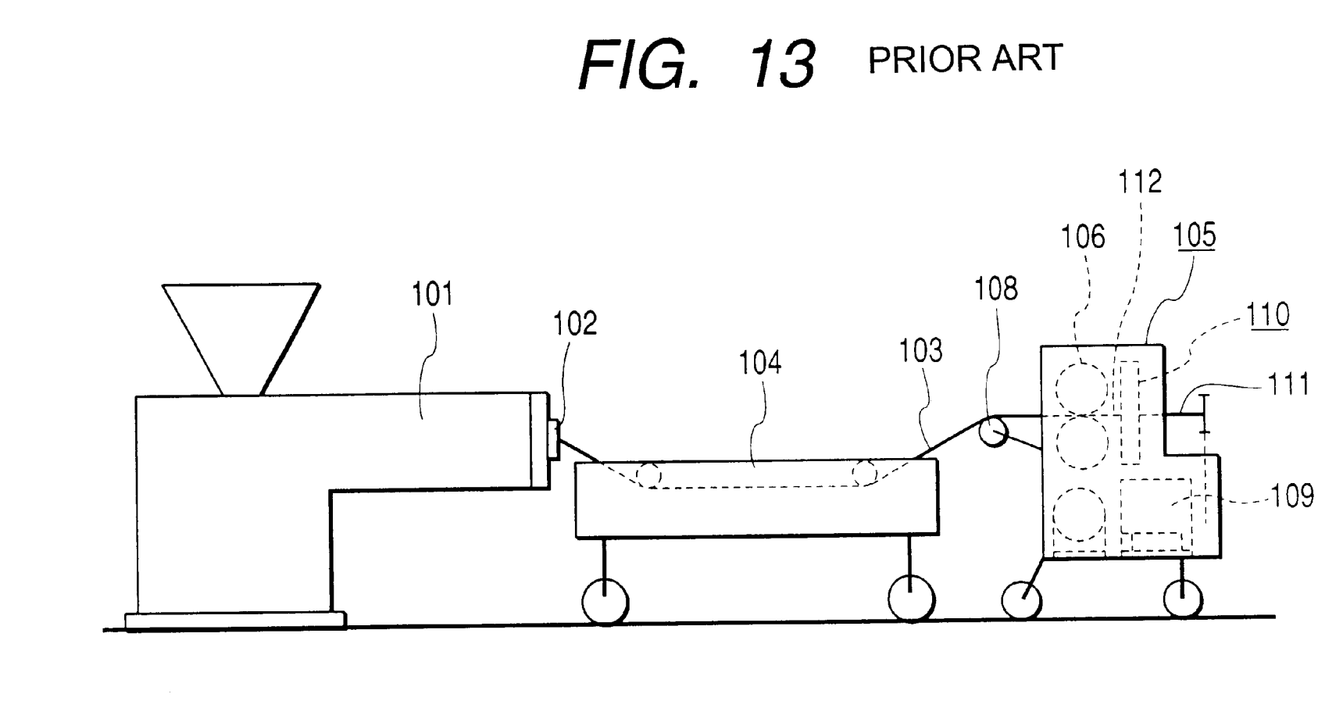
FIG. 13 is an explanatory schematic diagram showing the entire configuration of an example of conventional the strand cutting apparatuses.

FIG. 13 is an explanatory schematic diagram showing the entire configuration of an example of conventional pellet manufacturing apparatuses of a strand-cut system. This pellet manufacturing apparatus is arranged in a manner that plastics is plasticized by an extruding device 101, then a strand 103 is extruded by an extruding die 102, then the strand 103 thus extruded is cooled and solidified by being passed through a cooling water bath 104, then the strand thus solidified is introduced into a strand cutting apparatus 105 through a guide roller 108 and sequentially cut into pellets.

The strand cutting apparatus 105 includes a take-up roller 106 formed by a pair of upper and lower rollers for taking up and sending a strand 103 on a fixed blade 112, the fixed blade 112 having a blade edge extending perpendicularly with respect to the traveling direction of the strand 103, a disc-shaped rotation cutter 110 for sequentially cutting the strand 103 thus sent on the fixed blade 112, and a motor 109 for rotating the rotation shaft 111 of the rotation cutter 110, or the like.

Figure 14:
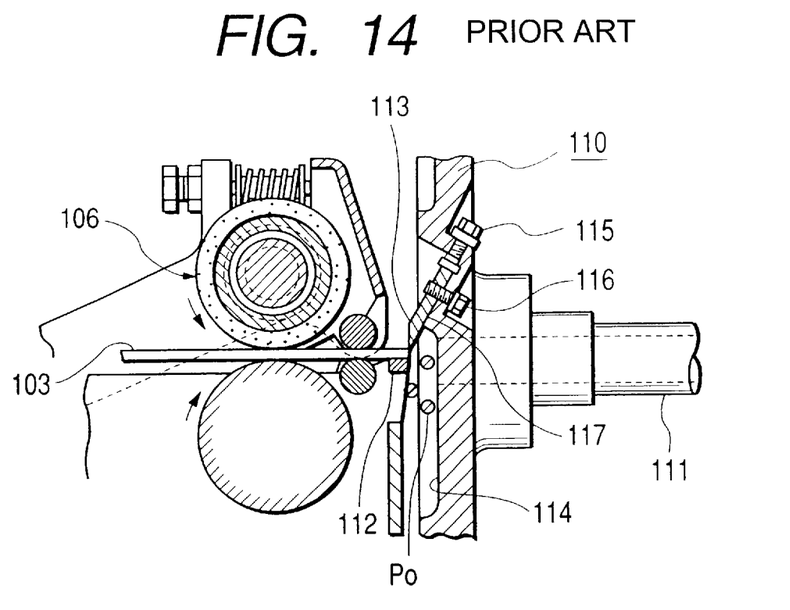
FIG. 14 is a typical fragmentally sectional view of the strand cutting apparatus of FIG. 13 which shows the section of the main portion of the strand cutting apparatus cut away along the axial direction thereof.
Figure 15:
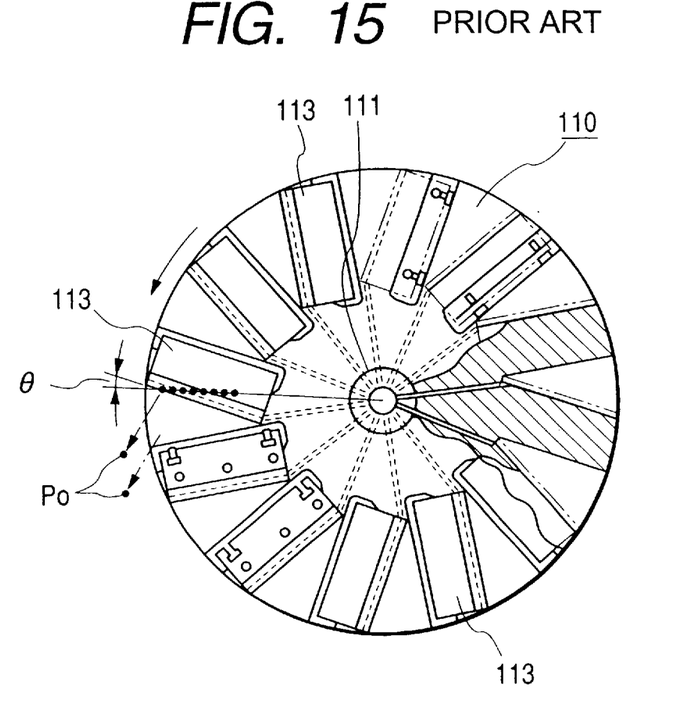
FIG. 15 is a typical front view of the rotation blade of the strand cutting apparatus shown in FIG. 13.

As shown in FIGS. 14 and 15, the rotation shaft 111 of the rotation cutter 110 is pivotally supported in a state that the shaft is disposed so as to be perpendicular to the blade edge of the fixed blade 112 and deviated toward the one side of the fixed blade 112. The rotation cutter 110 is provided on the front surface thereof opposing to the blade edge of the fixed blade 112 with a plurality of plate-shaped blades 113 disposed radially. The blade edge of the plate-shaped blade 113 crosses with the blade edge of the fixed blade 112 with an angle θ so as to sequentially cut the strand 103 into pellets P0. The rotation cutter 110 is provided on the front surface thereof with a plurality of guide grooves 114 for guiding the pellets P0 thus cut.

The plurality of plate-shaped blades 113 are fitted into plate-shaped guide grooves 117 provided on the front surface of the rotation cutter 110, respectively. The plate-shaped blades 113 are arranged to be fixed to the rotation cutter 110 by fastening the fastening bolts 116 after adjusting amounts of protrusion of the bladed edges of the plate-shaped blades by rotating forwardly and reversely the push pull bolts 115 which are engaged with the screw holes provided at the rear surface side of the rotation cutter 110, respectively.

According to the aforesaid conventional technique, at the time of adjusting the amounts of protrusion of the bladed edges of the respective plate-shaped blades from the front surface of the rotation cutter so as to provide a predetermined clearance between the bladed edges of the respective plate-shaped blades of the rotation cutter and the blade edge of the fixed blade, the length (distance) of the clearance between the bladed edge of the plate-shaped blades of the rotation cutter and the blade edge of the fixed blade is measured manually by using a clearance gauge at every blade edge of the respective plate-shaped blades. Thus, there arises a problem that the adjusting procedure of the length is troublesome and requires high skill and further there arises a problem as to safety that a hand or a finger may be injured.

Further, since the rotation shaft etc. of the rotation cutter extends due to the thermal expansion, unless the length of the clearance between the bladed edge of the plate-shaped blades disposed at the rotation cutter and the blade edge of the fixed blade is set to be longer than the extension length caused by the thermal expansion, there arises a problem that such an accident occurs that the bladed edges of the respective plate-shaped blades of the rotation cutter interfere with the blade edge of the fixed blade to break the blade edges.

SUMMARY OF THE INVENTION

Accordingly, the present invention has been made in view of the aforesaid problems of the prior art, and an object of the present invention is to realize a strand cutting apparatus which can perform easily and safely the adjusting procedure of a clearance between the bladed edges of the respective plate-shaped blades disposed at a rotation blade and the blade edge of a fixed blade.

Another object of the present invention is to realize a method and an apparatus for cutting a strand which can avoid the occurrence of such an accident that the bladed edges of the respective plate-shaped blades of a rotation cutter interfere with the blade edge of a fixed blade to break the blade edges.

In order to attain the aforesaid object, the strand cutting method according to the present invention is provided by comprising the steps of:

sequentially abutting blade edges of plate-shaped blades disposed radially at a rotation blade by means of push pull bolts against a blade edge of a fixed blade having the blade edge extending perpendicularly with respect to a traveling direction of the strand; and after fastening the plate-shaped blades by fastening bolts, separating the rotation blade from the fixed blade to adjust a clearance between the blade edge of the fixed blade and the blade edges of the plate-shaped blades.

Also, the strand cutting method according to the present invention is provided by comprising the steps of:

On a pedestal to which a fixed blade having a blade edge extending perpendicularly with respect to a traveling direction of a strand, placing a blade edge adjusting jig having a wall surface with such a height that an entire length of each of the blade edges of the plate-shaped blades disposed radially at a rotation blade extends to the entire height and a surface which is provided at a rear side of the wall surface so as to be in parallel to the wall surface and have a uniform thickness and against which the blade edge of the fixed blade abuts;

sequentially abutting the plate-shaped blades disposed radially at the rotation blade against the wall surface due to dead weights of the plate-shaped blades thereby to fasten the plate-shaped blades by fastening bolts and to remove the blade edge adjusting jig; and moving the rotation blade closely to the fixed blade to adjust a clearance between the blade edge of the fixed blade and the blade edges of the plate-shaped blades.

The strand cutting apparatus according to the present invention is arranged in a manner that in the strand cutting apparatus including a fixed blade having a blade edge extending perpendicularly with respect to a traveling direction of a strand, a supporting member opposing to one side of the fixed blade with a clearance therebetween, a rotation shaft supported by a supporting member through a bearing mechanism so as to be freely rotatable and extending perpendicularly to the blade edge of the fixed blade, a disc-shaped rotation blade provided integrally at a tip end of the rotation shaft, a plurality of guide grooves provided radially on a front surface of the rotation shaft opposing to the blade edge of the fixed blade, and plate-shaped blades respectively disposed in the guide so that an amount of protrusion of each of blade edges of the plate-shaped blades is freely changed, the strand cutting apparatus is provided in that the supporting member is guided by a guide means so as to be movable freely and linearly along a same direction as an axial direction of the rotation shaft, the rotation shaft integrally provided at a tip end of the rotation shaft is linearly moved to the same direction as the axial direction of the rotation shaft so that a clearance between the blade edge of the fixed blade and the blade edges of the plate-shaped blades can be adjusted.

Preferably, a blade edge adjusting jig for adjusting the clearance between the blade edge of the fixed blade and the blade edges of the plate-shaped blades is placed on a pedestal at which the fixed blade is attached, the blade edge adjusting jig having a wall surface with such a height that an entire length of each of the blade edges of the plate-shaped blades extends to the entire height and a surface which is provided at a rear side of the wall surface so as to be in parallel to the wall surface and have a uniform thickness and against which the blade edge of the fixed blade abuts.

Preferably, the rotation blade is provided with guide grooves which are extended radially and arranged with a constant interval from one another, and each of the plate-shaped blades is attached to one slanted surface of a corresponding one of the guide grooves by means of fastening bolts so that each of the plate-shaped blades slips down along the slanted surface due to dead weight of the plate-shaped blade.

Preferably, the bearing mechanism is freely movable together with the rotation shaft to the axial direction of the rotation shaft relative to the supporting member only by a predetermined distance, and the bearing mechanism is always biased by an elastic member toward the fixed blade.

Preferably, the fixed blade has the blade edge protruding to the rotation blade side, and the blade edge is provided with a slanted surface formed through a chamfer processing at a side portion of an inner diameter side of the blade edge.

Preferably, each of the plurality of plate-shaped blades is disposed in a manner that the plate-shaped blade firstly crosses at an inner diameter side of the blade edge thereof with the blade edge of the fixed blade in accordance with rotation of the rotation blade to form an angle within a range of 2 to 15 degrees between the blade edge of the plate-shaped blade and the blade edge of the fixed blade.

DETAILED DESCRIPTION OF PREFERRED EMBODIMENTS

The embodiments of the strand cutting apparatus according to the present invention will be explained with reference to the accompanying drawings.

First Embodiment

Figure 1:
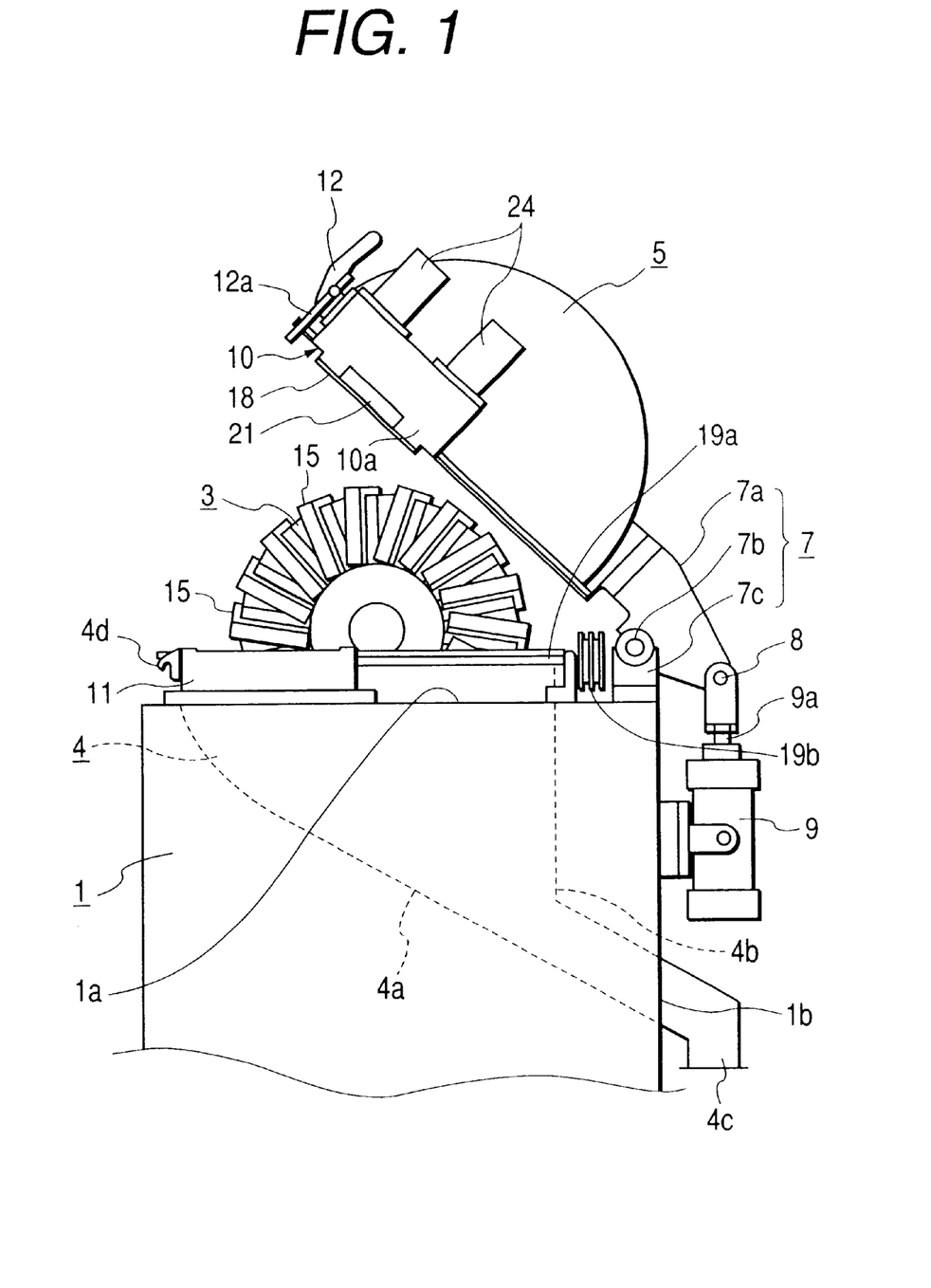
FIG. 1 is a typical front view of the strand cutting apparatus according to the first embodiment showing a state that an upper casing thereof is opened.
Figure 2:
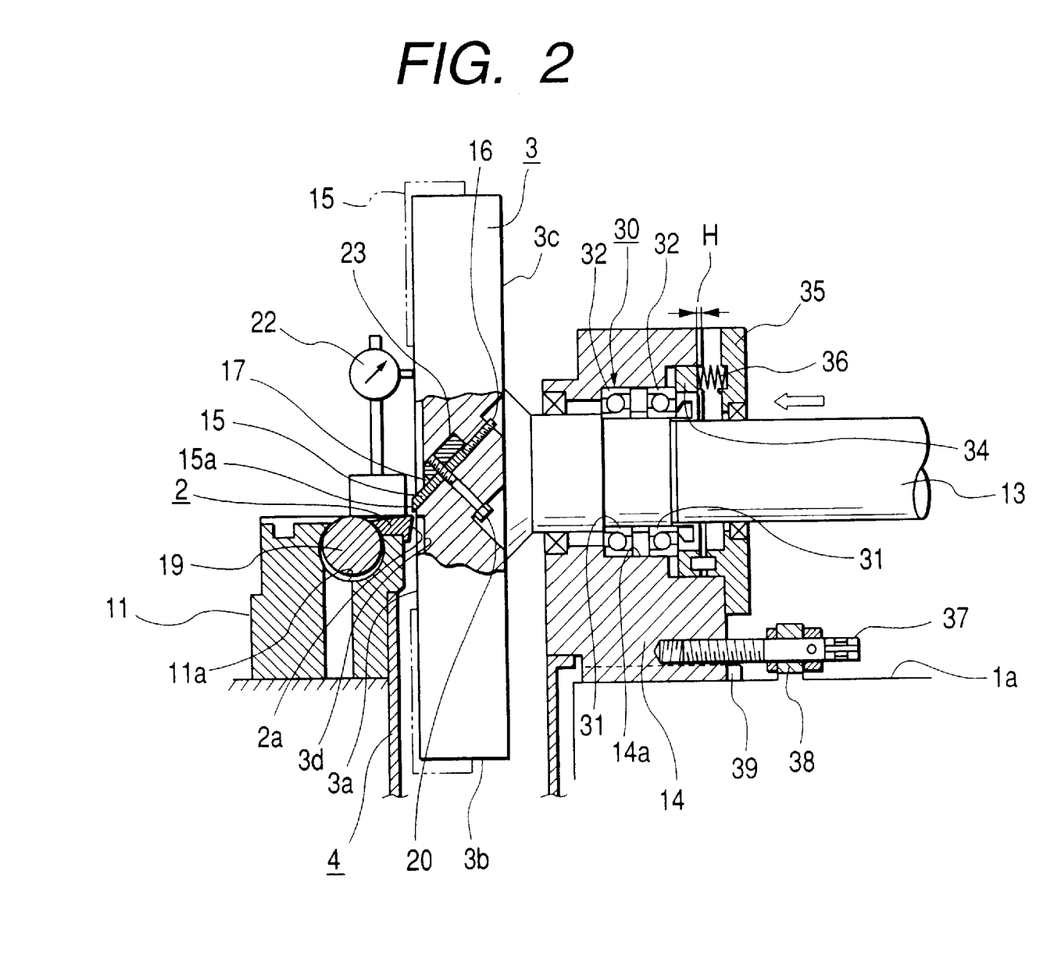
FIG. 2 is a typical fragmentally sectional view of the strand cutting apparatus of FIG. 1 which shows the section of the main portion of the strand cutting apparatus cut away along the axial direction thereof.
Figure 3:
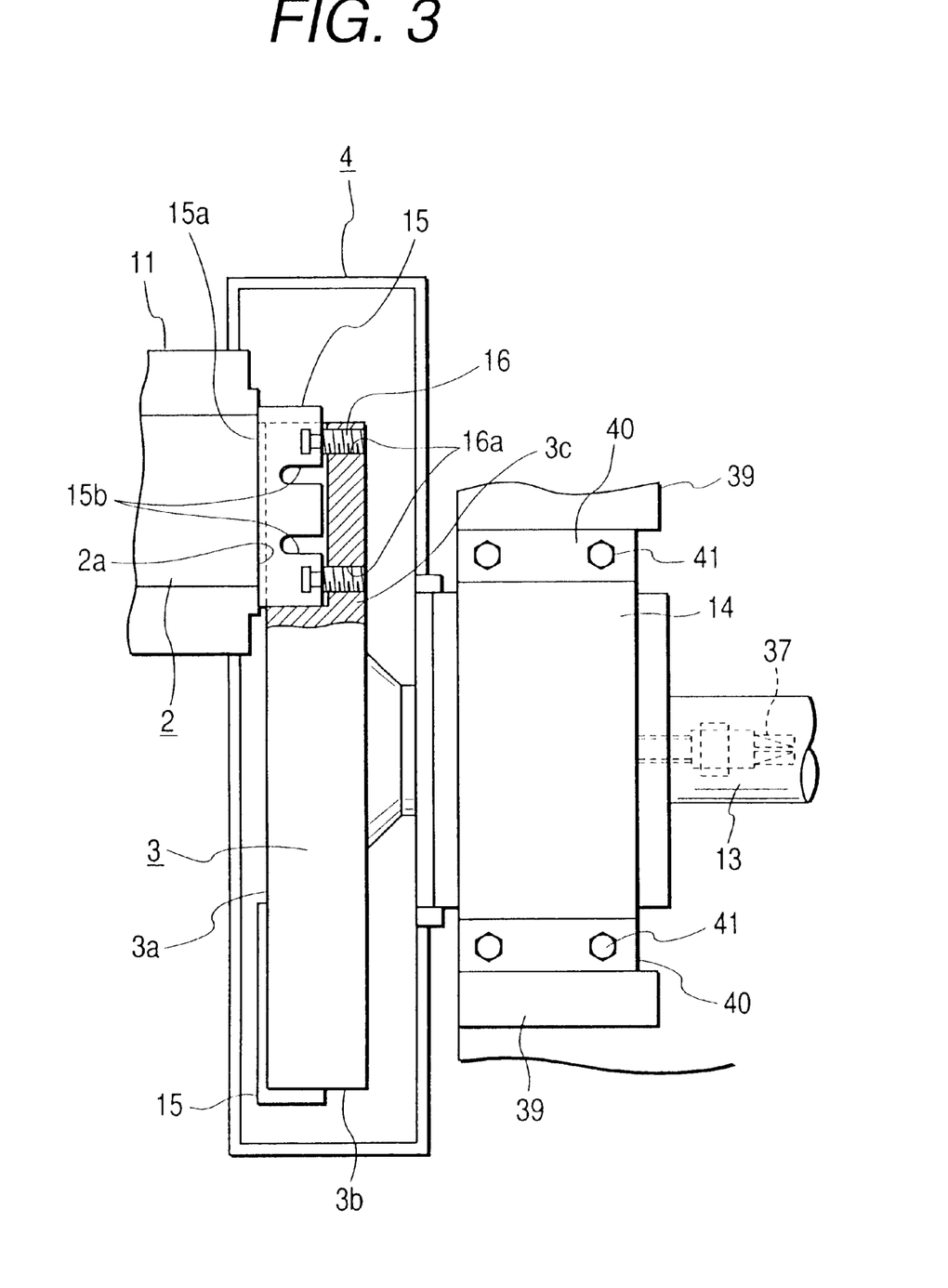
FIG. 3 is a typical top view of the portion shown in FIG. 2.

FIG. 1 is a typical front view of the strand cutting apparatus according to the first embodiment showing a state that an upper casing thereof is opened. FIG. 2 is a typical fragmentally sectional view of the strand cutting apparatus of FIG. 1 which shows the section of the main portion of the strand cutting apparatus cut away along the axial direction thereof. FIG. 3 is a typical top view of the portion shown in FIG. 2.

The strand cutting apparatus according to the first embodiment includes a take-up roller formed by a pair of upper and lower rollers 18, 19 for taking up and sending a strand (not shown) on a fixed blade 2, the fixed blade 2 having a blade edge 2a extending perpendicularly with respect to the traveling direction of the strand, a supporting member 14 opposed to the one side of the fixed blade 2 with a clearance therebetween, a rotation shaft 13 which is disposed to extend so as to be perpendicular to the blade edge 2a of the fixed blade 2 and is supported by the supporting member 14 through a bearing mechanism 30 so as to be freely rotatable, a rotation blade 3 which is fixed to the tip portion of the rotation shaft 13 and has a plurality of plate-shaped blades 15 disposed radially at a front surface 3a opposing to the blade edge 2a of the fixed blade 2, and a cover 6 (see FIG. 5) for receiving pellets sequentially formed by cutting the strands by means of the fixed blade 2 and the rotation blade 3 and for exhausting the pellets out of the apparatus.

A plurality of guide grooves 3d for guiding the pellets thus cut to the outside along the radius direction are formed at the front surface 3a of the rotation blade 3 so as to extend radially from the vicinity of the blade edges 15a of the respective plate-shaped blades 15.

The rotation blade 3 is provided with a plurality of guide grooves 17 for the plate-shaped blades which are opened at the front surface 3a and the outer peripheral surface 3b thereof and extending radially. The plate-shaped blades 15 are respectively fitted into the guide grooves 17 in a state that the blade edges 15a thereof are protruded from the front surface 3a.

Each of the guide grooves 17 for the plate-shaped blades is slanted with respect to the rotation shaft center with a predetermined upgrade slanted angle from the front surface 3a side to the rear surface 3c side of the rotation blade 3 and is disposed in a manner that the radial inner side of the blade edge 15a of the plate-shaped blade 15 firstly crosses with the blade edge 2a of the fixed blade 2 in accordance with the rotation of the rotation blade 3 to form a predetermined angle between both the blade edges 15a and 2a (hereinafter called an intrusion angleθ) at this time. That is, each of the guide grooves is slanted to the anti-rotation direction with respect to the radiation lines of the rotation blade (see FIG. 4). Each of the plate-shaped blades 15 is arranged in a manner that a protruding amount thereof from the front surface 3a can be changed within a range of the length of a slit 15b of the plate-shaped blade 15 by forwardly and reversely rotating a push pull bolt 16 which is engaged with a pair of screw holes (see FIG. 3) which penetrate from the rear surface 3c of the rotation blade 3 to the bottom wall of the corresponding guide groove 17 for the plate-shaped blade. Further, each of the plate-shaped blades 15 can be fixed by fastening a fastening bolt 20 which penetrates through the slit 15b from the rear surface 3c side and is engaged with a fastening plate 23.

Figure 4:
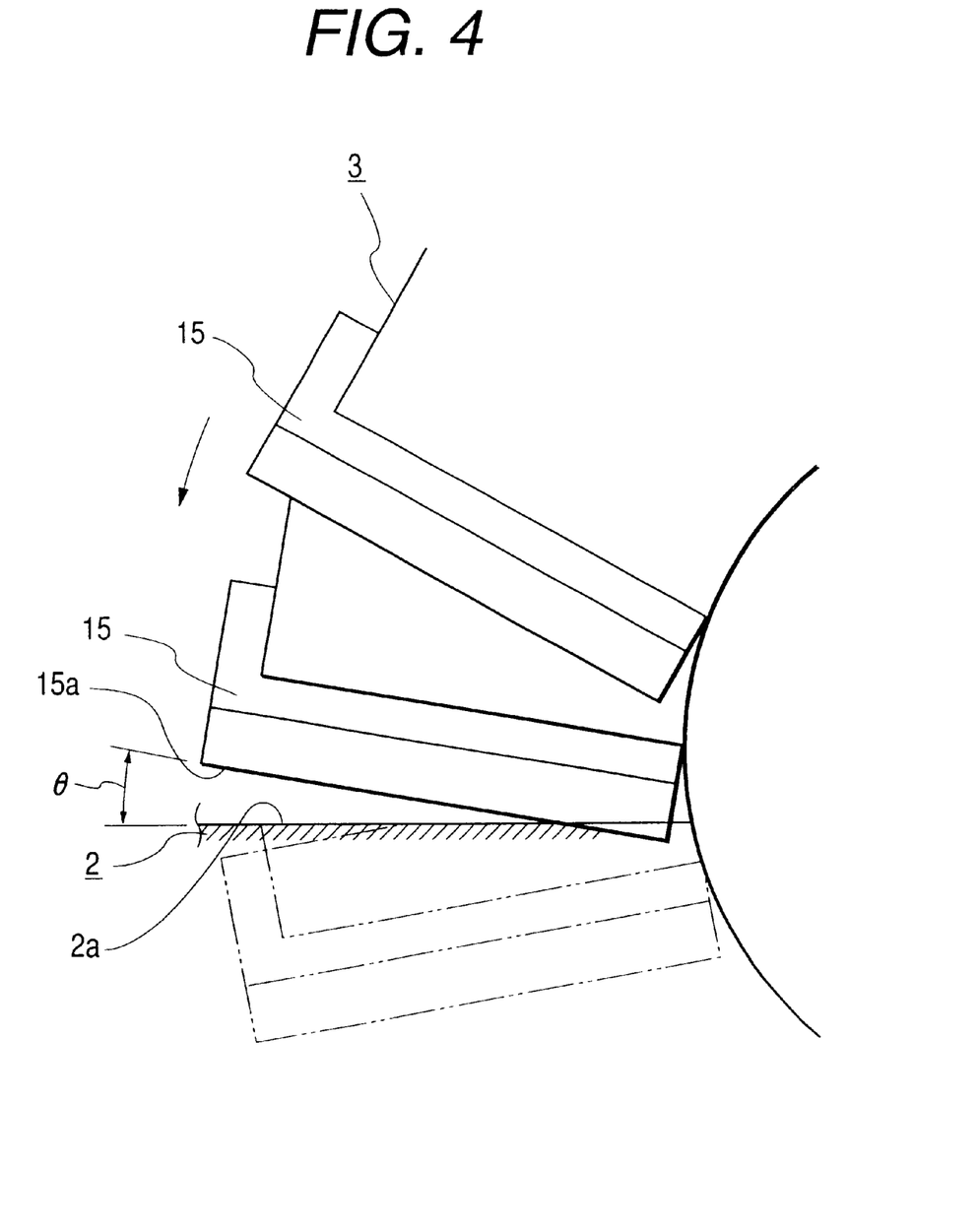
FIG. 4 is an explanatory diagram showing the relation between the blade edge of a fixed blade and the plate-shaped blade of a rotation blade.

According to the present invention, when the aforesaid intrusion angleθ between both the blade edges 15a and 2a is set in a range of 2° to 15°, a plurality of the strands aligned on the blade edge 2a of the fixed blade 2 are sequentially cut one by one from the radial inner side of the blade edge 15a of the plate-shaped blade 15 in a manner that the strand can be cut almost vertically without being bent at the time of the cutting operation. As a result, the load applied to the plate-shaped blade 15 of the rotation blade 3 can be reduced and the noise generated at the time of the cutting operation can also be reduced.

When the intrusion angleθ is set to be smaller than 2°, a plurality of the strands aligned on the blade edge 2a of the fixed blade 2 are sequentially cut in a manner that two or more strands are cut simultaneously by the blade edges 5a of the plate-shaped blades 15 of the rotation blade 3, so that the noise generated at the time of the cutting operation becomes large. In contrast, when the intrusion angleθ is set to be larger than 15°, a plurality of the strands aligned on the blade edge 2a of the fixed blade 2 are deviated to a large extent toward the radially outside and bent before being cut by the blade edge 15a of the plate-shaped blade 15 of the rotation blade 3, so that the strands can not be cut vertically and so the pellet is cut into a diamond shape.

The rotation shaft 13 is pivotally supported so as to be freely rotatable at its tip end side portion in the vicinity of the rotation blade 3 by the supporting member 14 which can adjust the position of the rotation shaft along the direction same as the axial direction of the rotation shaft 13 on the upper wall 1a of a casing 1. The rotation shaft is forcedly rotated by a known rotation driving means (not shown) which is disposed at the rear end side of the rotation shaft and allows the rotation shaft to move to the axial direction thereof.

The supporting member 14 includes flange portions 40 which are provided at the both sides thereof so as to protrude downward and fitted so as to be slidable freely between a pair of guide plates 39 which are disposed in parallel to the rotation shaft 13 on the upper wall 1a of the casing 1. The supporting member is arranged in a manner that, by forwardly and reversely rotating an adjusting bolt 37 which is disposed so as to be rotatable freely at a supporting member 38 integrally provided at the upper wall 1a, the supporting member is guided by the pair of guide plates 39 and moved at a predetermined position along the same direction as the axial direction of the rotation shaft 13 and then can be fixed to the flange portions by fastening stop bolts 41 which are fitted into not-shown through holes of the flange portions 40. In other words, the supporting member 14 is guided by the pair of guide plates 39 serving as a guiding means so as to be freely movable linearly to the same direction as the axial direction of the rotation shaft 13, whereby the rotation blade 3 integrally provided at the tip portion of the rotation shaft 13 as well as the supporting member 14 are linearly moved to the same direction as the axial direction of the rotation shaft 13 and can be fixed at the predetermined position.

The rotation shaft 13 is pivotally supported by the supporting member 14 through a duplex angular contact ball bearing 30. The duplex angular contact ball bearing 30 is arranged in a manner that a pair of inner races 31 thereof are fixed to the rotation shaft 13 and a pair of outer races 32 are fitted into the bearing holes 14a of the supporting member 14 so as to be freely slidable along the axial direction. A collar member 34 is fitted into the supporting member so as to be freely slidable along the axial direction in adjacent to the outer race 32 of the rear side. A compression spring 36 serving as an elastic member is placed between the collar member 34 and a lid 35, whereby the collar member is always biased toward the fixed blade side (an arrow direction) so that a clearance H is generated between the collar member 34 and the tip portion of the lid 35.

The length of the clearance H is preferably set to be a length corresponding to an extended amount of the rotation blade 3 and the rotation shaft 13 etc. caused at least by thermal expansion. The compression spring 36 is preferably set to have such a resilient force that the rotation shaft 13 does not move backward unintentionally at the time of cutting the strand to form pellets but the rotation shaft 13 moves backward when such an unexpected large load is applied that the blade edge 2a of the fixed blade 2 or the blade edges 15a of the plate-shaped blades 15 is broken.

The cover 6 is formed by a lower casing 4 of almost funnel-shape having an opened portion at the upper surface thereof and an upper casing 5 provided at the opened portion of the lower casing 4 through a hinge portion 7 so as to be freely opened and closed.

The lower casing 4 includes a bottom wall 4a which continues from an arc-shaped portion at the vicinity of the opened portion of the upper surface thereof and slants toward the lower portion of one side wall 1b of the casing 1, and a side wall 4b extending almost vertically so as to oppose to the bottom wall 4a. The lower casing is arranged in a manner that the lower end portion of the bottom wall 4a communicates with an exhaust opening 4c which is opened to the outside of the casing so that the pellets thus cut can be exhausted outside of the casing 1.

The upper casing 5 is formed in a semi-cylindrical shape so as to cover the upper half portion of the rotation blade 3. On the non-fixed blade side (right side in the figure) of the upper casing, the almost center portion of a rotation arm 7a, which forms a part of the hinge portion 7 and is provided to protrude outward, is pivotally fixed through a pivot 7b to a projection member 7c which is provided to elect on the upper wall 1a of the casing 1. The tip portion of the rotation arm 7a is coupled through a pin 8 to the tip portion of the rod 9a of a fluid pressure cylinder 9 which is fixed to the one side wall 1b of the casing 1. According to such an arrangement, when the fluid pressure cylinder 9 is activated to expand and contract the rod 9a, the rotation arm rotates around the pivot 7b, so that the upper casing can open and close the opened portion of the lower casing 4. A clamp 12 of a rotation handle type is provided at the outer surface of the fixed blade side (left side in the figure) of the upper casing 5 in a manner that, when the hook 12a of the clamp 12 is engaged with an engaging portion 4d provided at the lower casing 4 at the time of closing the upper casing 5, the upper casing is prevented from being opened inadvertently.

Figure 5:
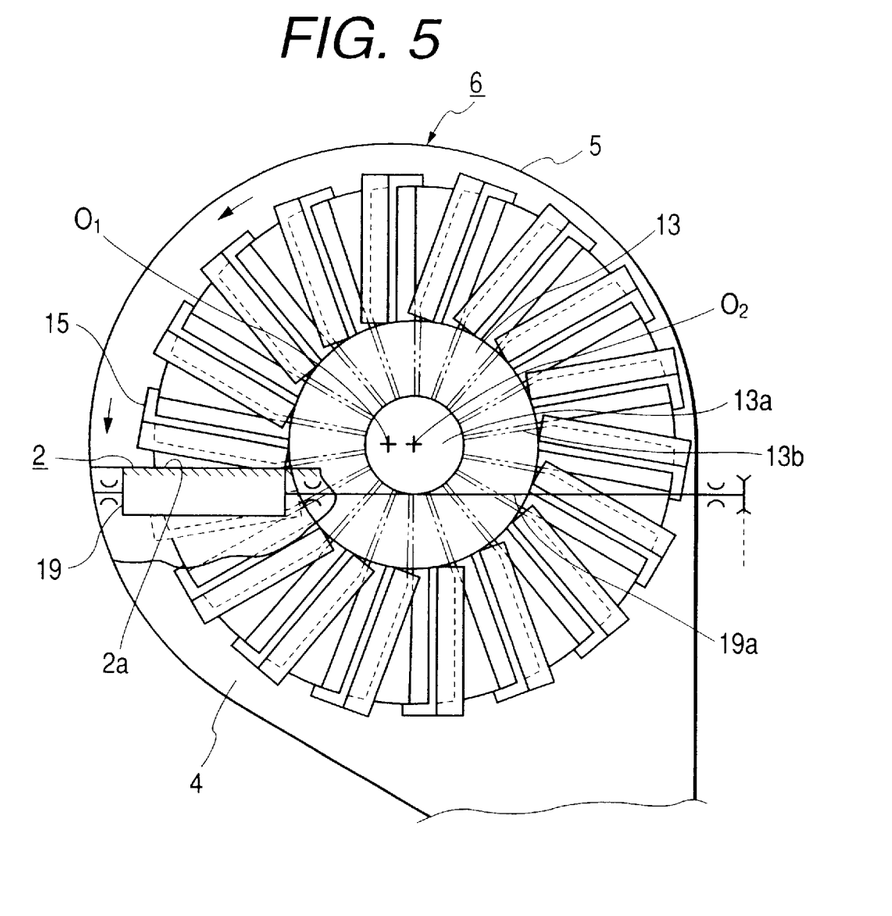
FIG. 5 is an explanatory diagram showing the positional relation between the rotation blade and the cover in the strand cutting apparatus shown in FIG. 1.

As shown in FIG. 5, the upper casing 5 of a semi-cylindrical shape is disposed in a state that the center O1 thereof is made eccentric toward the fixed blade side with respect to the rotation shaft center O2 of the rotation blade 3 and so arranged in a manner that, when the upper casing is closed with respect to the lower casing 4, the distance between the inner peripheral surface of the upper casing 5 and a phantom outer peripheral circle 40 drawn by the radial tip portion of the plate-shaped blade 15 of the rotation blade 3 increases gradually toward the rotation direction of the rotation blade 3 and becomes maximum at the side of the fixed blade 2. According to such a configuration, since the air flow is generated toward the arrow direction shown in the figure in accordance with the rotation of the rotation blade 3, the pellets P thus cut are directed toward the lower casing 4, whereby the pallets P are flown down along the slanted bottom wall 4a of the lower casing 4 and then exhausted out of the apparatus from the exhaust opening 4c without being piled up.

In the present invention, although the upper casing 5 is rotated by the power-driven device, that is, the fluid pressure cylinder 9 as shown in the embodiment, the present invention is not limited thereto, and the upper casing 5 may be arranged to be manually opened.

The lower roller 19 of the take-up roller 20 is disposed so as to be rotatable freely within a concave portion 11a provided at the upper surface of a pedestal 11, and is forcedly rotated by means of a belt which is wound between a pulley 19b integrally provided at the tip portion of a rotation shaft 19a protruded at the right side in FIG. 1 and a not-shown pulley of an output shaft of a not-shown driving motor. In contrast, the upper roller 18 is pivotally supported so as to be freely rotatable by the lower end portions of the rods (not shown) of a pair of fluid pressure cylinders 24 fixed to the upper casing 5.

Since the take-up roller is configured in the aforesaid manner, at the time of closing the upper casing 5 with respect to the lower casing 4, the pair of the fluid pressure cylinders 24 are activated to expand and contract the rod thereby to move the upper roller 18 forward and backward relative to the lower roller 19, whereby the strand can be taken up in such a state that the strand is applied with a predetermined pressing stress between the upper roller 18 and the lower roller 19 and then sent stably on the fixed blade 2.

A roller cover 10 integrally provided at the upper casing 5 is formed in an almost eaves shape so that the roller cover can cover the pedestal 11 so as not to expose it as well as the upper roller 18 when the upper casing 5 is closed relative to the lower casing 4. The roller cover is provided at the lower end portion of a front wall 10a thereof with a notch portion 21 serving as a strand introducing inlet 21.

In this embodiment, the adjustment procedure of the length of the clearance (separation distance) between the blade edge 2a of the fixed blade 2 and the blade edges 15a of the plate-shaped blades 15 of the rotation blade 3 can be performed quickly and safely by the simple method explained below.

① The stop bolts 41 are loosened so that the supporting member 14 can be guided and moved along the pair of the guide plates 39. In this state, the adjusting bolt 37 is rotated forwardly or reversely to move the shaft 13 to the axial direction together with the supporting member 14 thereby to position the supporting member at such a position that the distance of clearance between the blade edge 2a of the fixed blade 2 and the front surface 3a of the rotation blade 3 becomes a predetermined initial separation distance. Then, the stop bolts 41 are fastened to fix the supporting member.

In this process, it is necessary to set the initial separation distance to be longer than the aforesaid extended amount of the rotation blade and the rotation shaft etc. caused by the thermal expansion.

② By After the aforesaid process ①, one of the plate-shaped blades 15 of the rotation blade 3 is selected, then the fastening bolt 20 of the selected plate-shaped blade is loosed, and the associated push pull bolt 16 is rotated thereby to abut the blade edge 15a at the inner diameter side of this selected plate-shaped blade 15 against the blade edge 2a of the fixed blade 2. Thereafter, the push pull bolt 16 is rotated while rotating the rotation blade 3 manually thereby to abut the blade edge 15a at the outer diameter side of this selected plate-shaped blade 15 against the blade edge 2a of the fixed blade 2, and then the fastening bolt 20 of the selected plate-shaped blade is fastened to fix the selected plate-shaped blade 15 at the rotation blade 3.

③ After the aforesaid process ②, each of the remaining plate-shaped blades 15 of the rotation blade 3 is subjected to the processing same as the afore said process ② by rotating the rotation blade 3 manually thereby to abut the blade edges 15a of all the plate-shaped blades 15 against the blade edge 2a of the fixed blade 2.

④ After the aforesaid process ③, a dial gauge 22 is set at the fixed blade 2 side so that the distance along the axial direction can be measured. Further, the stop bolts 41 are loosened so that the supporting member 14 can be guided and moved along the pair of the guide plates 39. In this state, the adjusting bolt 37 is rotated to separate the shaft 13 from the fixed blade 2 together with the supporting member 14 thereby to position the supporting member at such a position that the separation distance between the blade edge 2a of the fixed blade 2 and the front surface 3a of the rotation blade 3 measured by the dial gauge 22 becomes the predetermined set value. Then, the stop bolts 41 are fastened to fix the supporting member.

In this process, since the supporting member 14 is guided between the pair of guide plates 39 to move to the axial direction of the shaft 13 which is perpendicular to the blade edge 2a of the fixed blade 2, the length of the clearance between the blade edge 2a of the fixed blade 2 and the blade edges 15a of the plate-shaped blades 15 of the rotation blade 3 can be set at the predetermined set value with a high accuracy by measuring the separation distance between the blade edge 2a of the fixed blade 2 and the front surface 3a of the rotation blade 3 using the dial gauge 22.

An example of the modification of the fixed blade will be explained.

Figure 6:
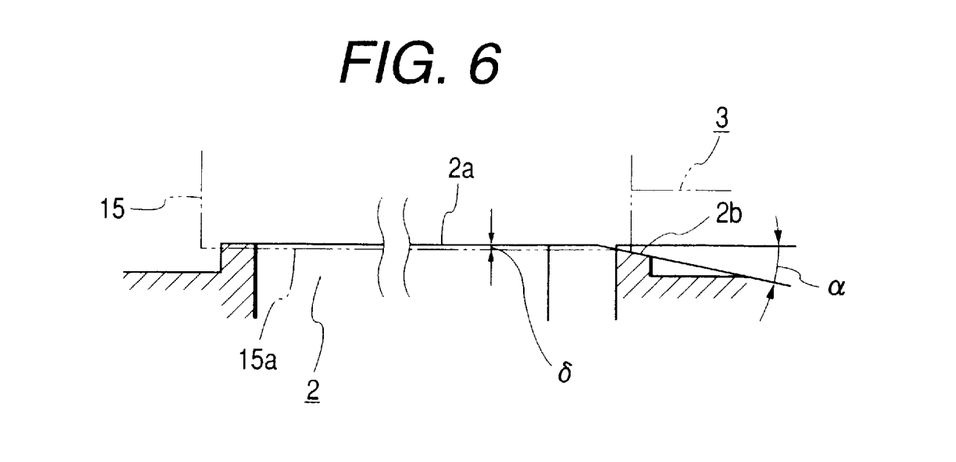
FIG. 6 is an explanatory diagram showing the relation between the blade edge of a fixed blade and the plate-shaped blade of a rotation blade in a modification of the present invention.

As shown in FIG. 6, the fixed blade 2 according to this modification is provided with a slanted surface 2b with a chamfer angle α formed through a chamfer processing at the side end portion of the inner diameter side of the blade edge 2a protruding toward the rotation blade 3 side. Each of the fixed blade 2 and the plate-shaped blades 15 of the rotation blade 3 is formed by material with excellent wear and abrasion resistance such as hard metal or cemented carbide or the like.

According to this modification, as shown in FIG. 6, even in the case where the blade edge 15a of the plate-shaped blade 15 overlaps with the blade edge 2a of the fixed blade 2 by a length δ due to the extension of the rotation blade 3 and the rotation shaft 13 etc. caused by the thermal expansion, at the time where the inner diameter portion of the blade edge 15a of the plate-shaped blade 15 abuts against the blade edge 2a of the fixed blade 2, the shaft 13 smoothly moves backward along the slanted surface 2b by a length corresponding to the overlapped length δ against the resilient force of the compression spring 36 toward the direction shown by the arrow (see FIG. 2). Thus, the blade edges 15a of the plate-shaped blades 15 are automatically prevented from interfering with the blade edge 2a of the fixed blade 2. As aresult, the strand can be cut in a state that both the blade edges 15a and 2a are always placed in a contacted state to each other where there is no clearance between the blade edge 15a of the plate-shaped blade 15 of the rotation blade 3 and the blade edge 2a of the fixed blade 2, so that the apparatus of this modification can be used for cutting a strand made of plastics of soft rubber nature.

In the method of adjusting a clearance between the blade edges according to the aforesaid embodiment, the fastening bolts 20 are loosened and the blade edge 15a of the plate-shaped blade 15 is made slightly in contact with the blade edge 2a of the fixed blade 2 by using the push pull bolt 16 at the inner diameter side. Then, the rotation blade 3 is manually rotated until the blade edge 15a at the outer diameter side of the plate-shaped blade 15 is made in contact with the blade edge 2a, then the adjustment is performed by using the push pull bolt 16 at the outer diameter side like the aforesaid manner, and thereafter the plate-shaped blade 15 is fixed to the rotation blade 3 by means of the fastening bolts 20. After the respective plate-shaped blades 15 are adjusted one by one in this manner, the graduation of the dial gauge 22 is set to 0, and then the supporting member 14 supporting the blade 13 is moved by means of the adjusting bolt 37 to the direction away from the fixed blade 2 thereby to obtain a clearance equal to the amount of the movement between the blade edge 2a of the fixed blade 2 and the blade edges 15a of the plate-shaped blades 15. According to this method, since each of the plate-shaped blades 15 is slanted with an angle θ relative to the fixed blade 2, the blade edges 15a of the plate-shaped blades 15 are adjusted along the rotational direction while maintaining such a state that each of the blade edges 15a contacts with the blade edge 2a at points. Therefore, there arise variations of the strength in the contact states, so that there appears a slight error of the clearance between the inner diameter side and the outer diameter side of the plate-shaped blade 15, and hence the adjustment is required to be performed again. In this manner, it requires a high grade technique and takes much time to perform the adjustment at the two contact points. Further, the rotation blade 3 is configured in a manner that the adjustment and the attachment of the plate-shaped blades 15 are performed at the rear side thereof in view of the safety, so that the configuration of the rotation blade is complicated and the manufacturing cost thereof is high.

A second embodiment of the present invention described below is arranged in order to obviate such a problem.

Second Embodiment

Figure 7:
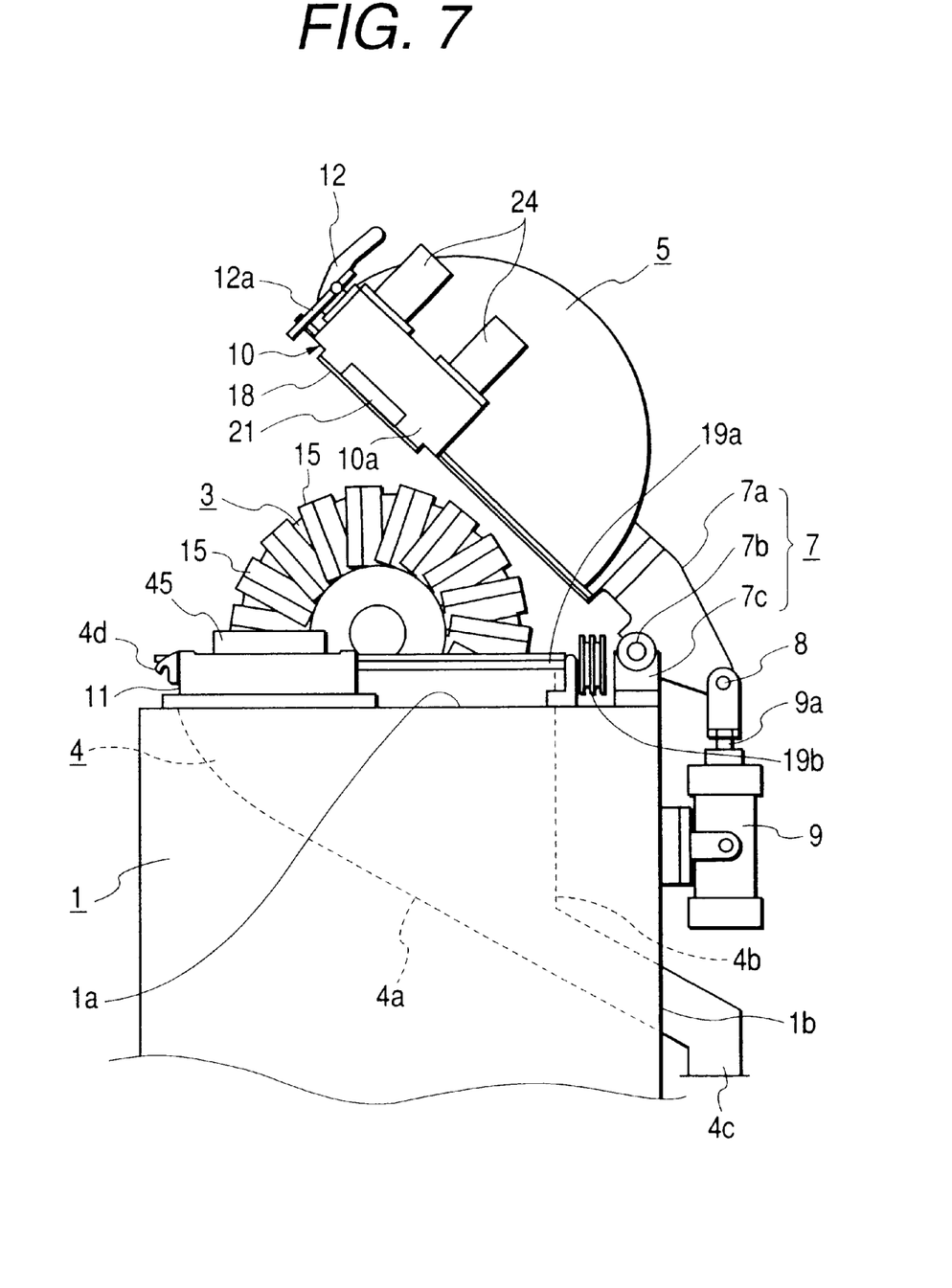
FIG. 7 is a typical front view of the strand cutting apparatus according to the second embodiment showing a state that an upper casing thereof is opened.
Figure 8:
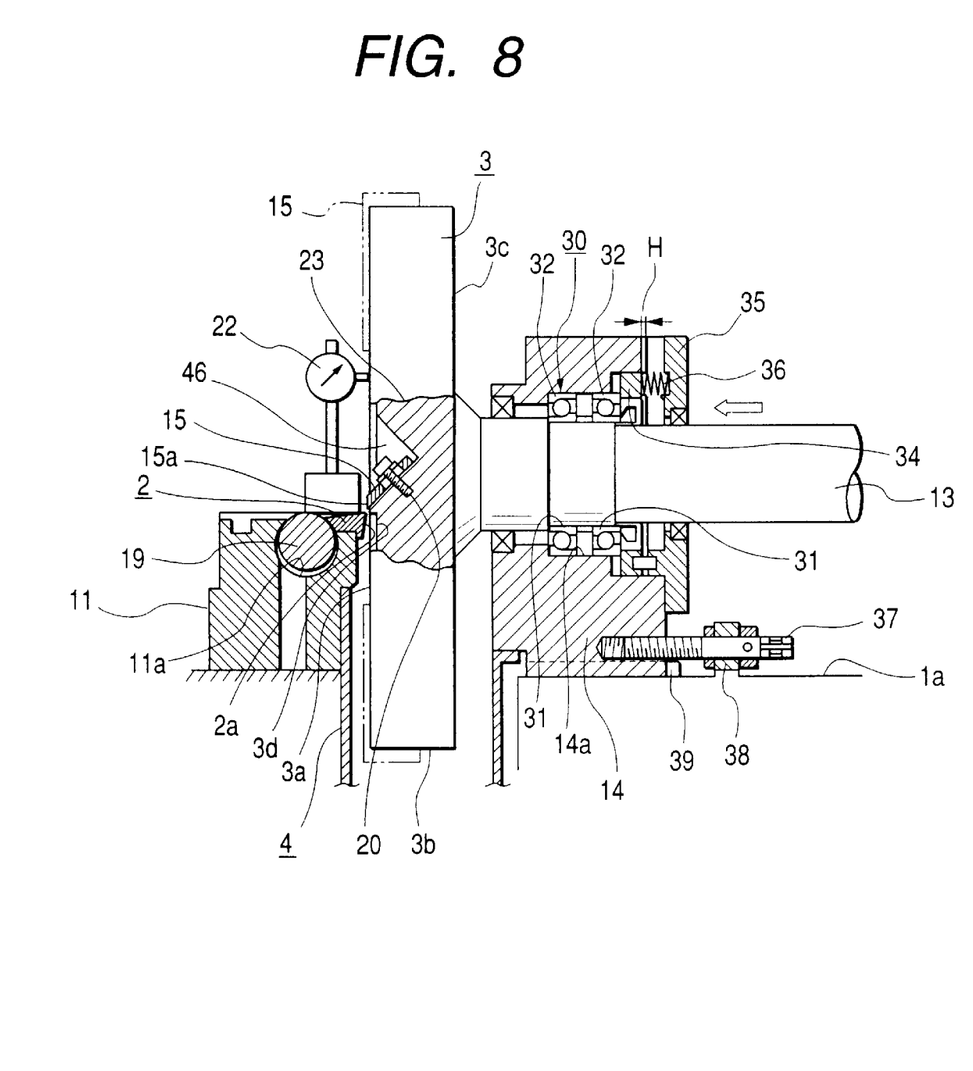
FIG. 8 is a typical fragmentally sectional view of the strand cutting apparatus of FIG. 7 which shows the section of the main portion of the strand cutting apparatus cut away along the axial direction therof.
Figure 9:
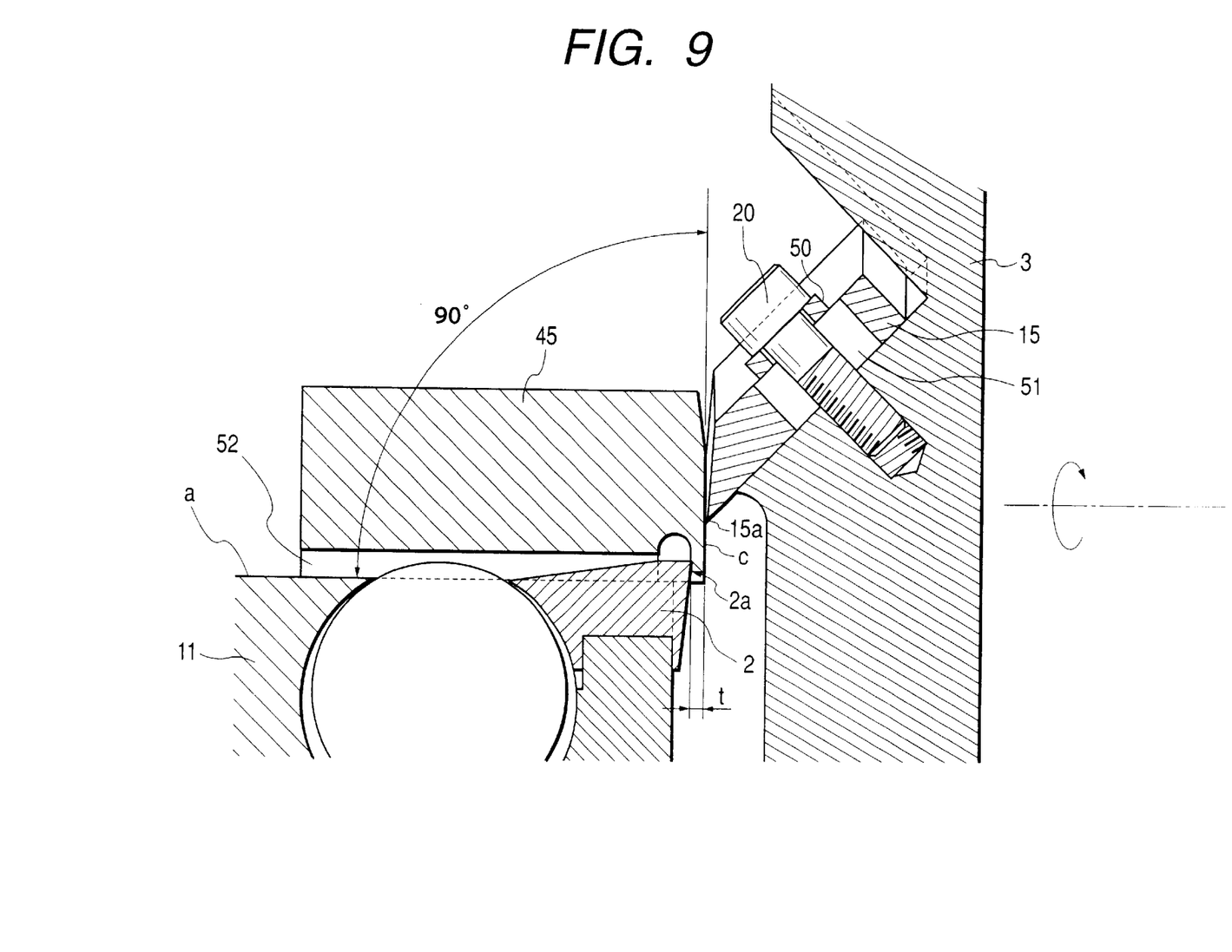
FIG. 9 is an enlarged diagram of the main portion of FIG. 8.

FIG. 7 is a typical front view of the strand cutting apparatus according to the second embodiment showing a state that an upper casing thereof is opened. FIG. 8 is a typical fragmentally sectional view of the strand cutting apparatus of FIG. 7 which shows the section of the main portion of the strand cutting apparatus cut away along the axial direction thereof. FIG. 9 is an enlarged diagram showing the main portion of FIG. 8. As shown in FIGS. 7 to 9, according to this embodiment, the fixed blade 2 and the plate-shaped blades 15 are arranged to have different configurations from those of the first embodiment, and a blade edge adjusting jig 45 is employed in order to adjust the clearance between the blade edge 2a of the fixed blade 2 and the blade edges 15a of the plate-shaped blades 15. Other configuration of the second embodiment is almost same as that of the first embodiment, and the explanation thereof is omitted.

Figure 10:
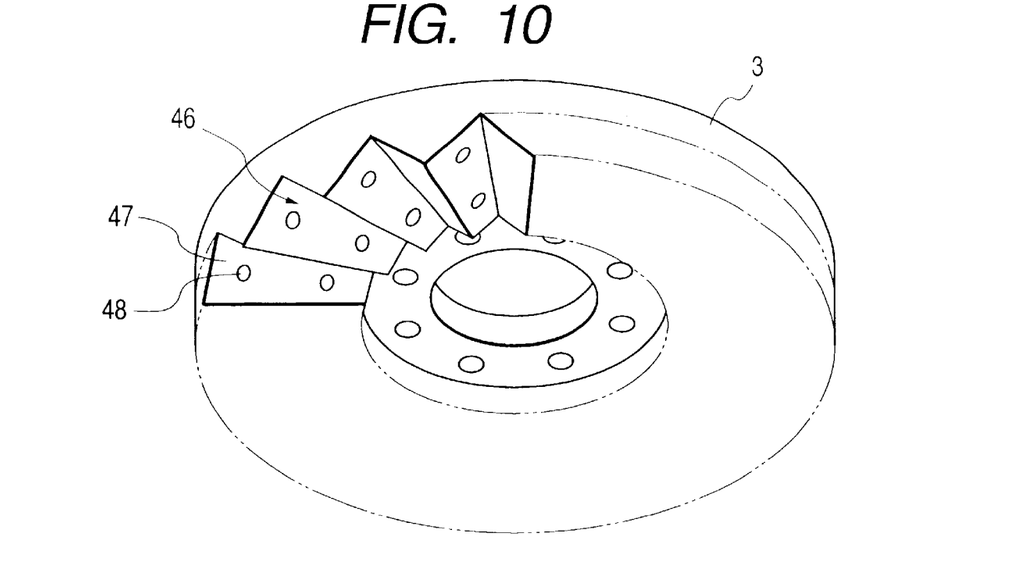
FIG. 10 is a perspective view of the rotation blade.
Figure 11:
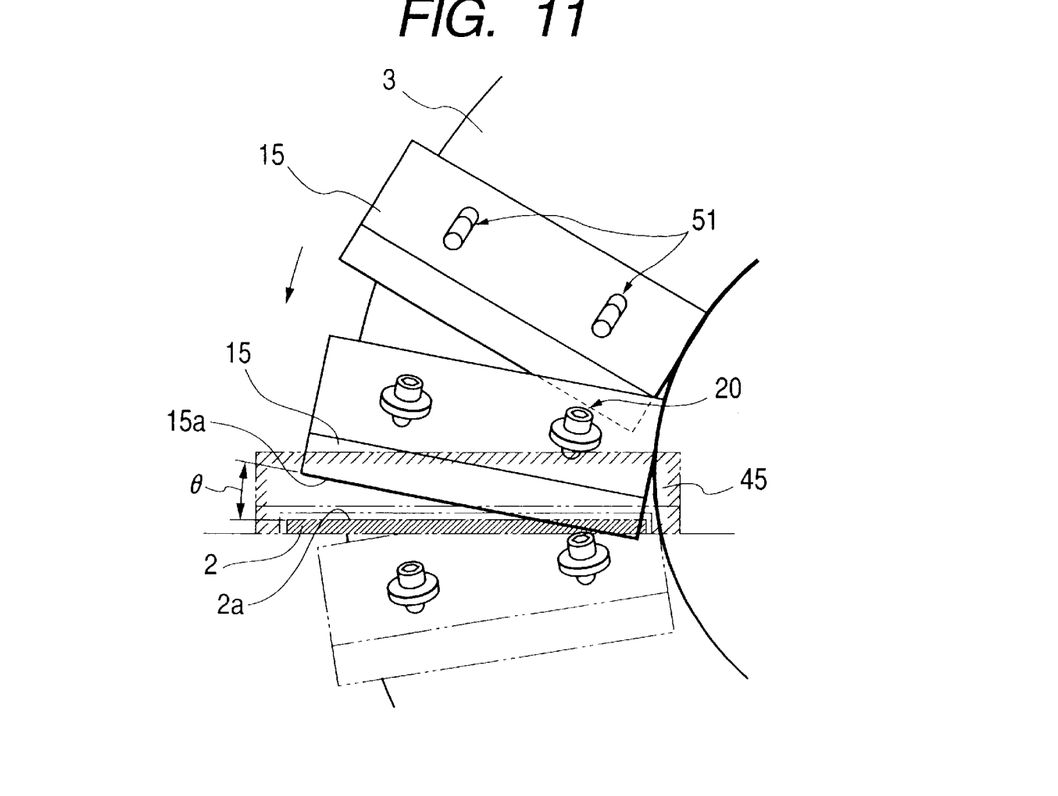
FIG. 11 is an explanatory diagram showing the relation among the rotation blade, a fixed blade and a blade edge adjusting jig.

As shown in FIGS. 9, 10 and 11, the rotation blade 3 is provided on its one surface with V-shaped guide grooves 46 which are extended radially and arranged with a constant interval from one another. Each of the guide grooves 46 is provided at its one slanted surface 47 with screw holes 48 for attaching the plate-shaped blade 15.

The plate-shaped blades is fastened to the slanted surface 47 of the rotation blade 3 by means of a plurality of the fastening bolts 20 through washers 50 from the front side. Each of the plate-shaped blades 15 is provided with elongated holes 51 for the fastening bolts 20 which are elongated toward the blade edge direction thereof and aligned along the longitudinal direction thereof.

Figure 12:
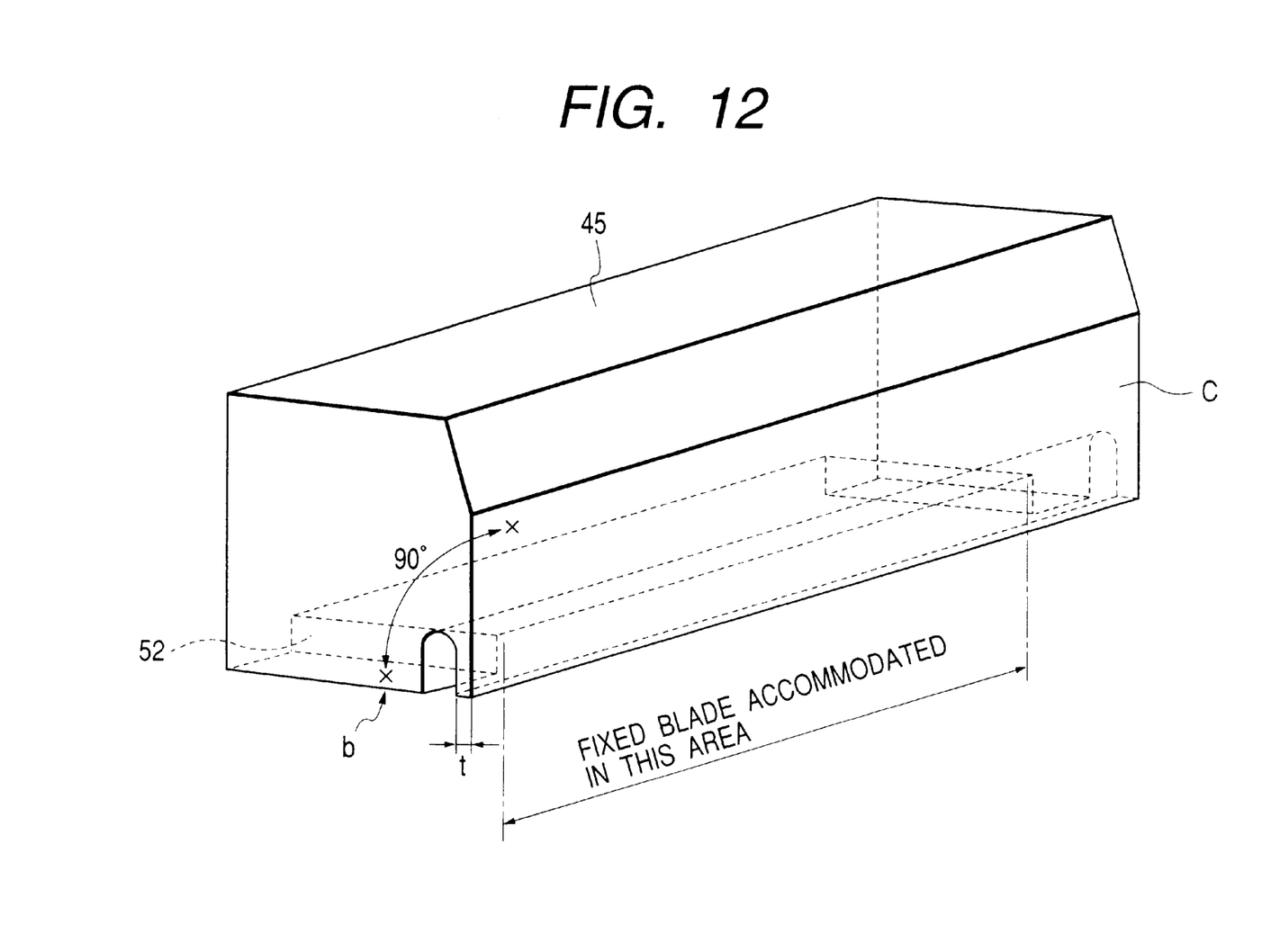
FIG. 12 is a perspective view of the blade edge adjusting jig.

As shown in FIGS. 9, 11 and 12, the blade edge adjusting jig 45 is placed on the bearing surface a of a pedestal 11 which is disposed in parallel to the rotation shaft center. The blade edge adjusting jig is provided on its bottom surface b with a rectangular-shaped groove 52 for covering the fixed blade 2 from the upper side thereof. The tip portion of the groove 52 is arranged to form a surface against which the blade edge 2a of the fixed blade 2 abuts. That is, at the time of adjusting the clearance between the blade edges, the blade edge adjusting jig 45 is used such that it is abutted against the blade edge 2a of the fixed blade 2 and the bearing surface a of the pedestal 11. The front surface of the blade edge adjusting jig 45 is arranged to form a flat wall surface c which is subjected to the hardening and abrasion finish processing so as to maintain the flat surface accuracy. The flat wall surface c and the surface against which the blade edge 2a of the fixed blade 2 abuts are arranged to be in parallel to each other, and a thickness t between these surfaces is set to have an accurate size. The flat wall surface c and the bottom surface b are finished to be perpendicular to each other. As shown in FIG. 11, the height of the blade edge adjusting jig 45 is set in a manner that the entire length of the blade edge of the plate-shaped blade 15 is disposed within the flat wall surface c when the blade edge 15a of the plate-shaped blade 15 is set to have an intrusion angleθ with respect to the blade edge 2a of the fixed blade 2.

Next, the method of adjusting the clearance between the blade edges of the plate-shaped blades of the fixed blade will be explained.

In FIG. 9, when the fastening bolts 20 of the plate-shaped blade 15 are loosened, the plate-shaped blade 15 slips down along the slanted surface 47 of the rotation blade 3 due to its own dead weight due to the presence of the elongated holes 51 elongated toward the blade edge side, and so the plate-shaped blade is made slightly in contact with the flat wall surface c of the blade edge adjusting jig 45 at the entire length of the plate-shaped blade. At this time pint, the fastening bolts 20 are fastened thereby to fix the plate-shaped blade 15 to the rotation blade 3. This procedure is performed sequentially as to each of all the plate-shaped blades 15. In this manner, each of the plate-shaped blades 15 is slipped down due to its own dead weight along the slanted surface 47 of the rotation blade 3, then each of the plate-shaped blades 15 is made in contact with the wall surface c of the blade edge adjusting jig 45 at the entirety of the plate-shaped blade, and each of the plate-shaped blades 15 is fastened by a plurality of the fastening bolts 20. Thus, the entirety of the plate-shaped blade is placed in a constant contact state with the wall surface. This contact state can be felt and confirmed by means of a hand by rotating the rotation blade 3 clockwise and counterclockwise manually. Then, as shown in FIG. 8, the blade edge adjusting jig 45 is removed, then the dial gauge 22 is disposed and set such that the relative position thereof with respect to the one end of the rotation blade 3 is set to be 0 point. Since the size t of the blade edge adjusting jig 45 having been measured in advance corresponds to the clearance between the blade edge 2a of the fixed blade 2 and the blade edge 15a of the plate-shaped blade 15, an operator makes the rotation blade 3 approach to the fixed blade 2 by means of the adjusting bolt 37 while looking at the dial gauge 22 by taking an amount of change of the clearance due to the thermal expansion etc. into consideration. When the clearance is set at the target value, the supporting member 14 is fixed at the upper wall 1a and the dial gauge 22 is removed, whereby the adjustment between the plate-shaped blade 15n and the fixed blade 2 is completed.

As described above, according to this embodiment, the fine adjustment of the clearance between the blade edges can be performed easily even for a layman by using the special blade edge adjusting jig 45. Further, the plate-shaped blades 15 can be mounted safely at the rotation blade since they can be mounted by using only one hexagonal wrench without directly handling them by hands. Furthermore, since the fixed blade 2 and the plate-shaped blades 15 are arranged with simple configuration, the manufacturing cost of the strand cutting apparatus can be reduced advantageously.

Third Embodiment

The third embodiment is arranged in a manner that the blade edge adjusting jig of the second embodiment is employed in the strand cutting apparatus according to the first embodiment.

In this case, it is required to loosely mount the push pull bolt 16 shown in FIG. 3 at the plate-shaped blade 15 in order to slips down the plate-shaped blade 15 along the slanted surface 47 of the rotation blade 3 due to its own dead weight by loosening the fastening bolts 20 shown in FIG. 2 thereby to make the plate-shaped blade slightly in contact with the flat wall surface c of the blade edge adjusting jig 45 at the entire length of the plate-shaped blade. Since the push pull bolt 16 is loosely mounted at the plate-shaped blade 15, this embodiment is advantageous in that, since the clearance between the blade edge 2a of the fixed blade 2 and the blade edge of the plate-shaped blade can be adjusted by pushing and pulling the plate-shaped blade 15, the clearance once adjusted by using the blade edge adjusting jig 45 can be finely adjusted by using the push pull bolt 16.

Since the present invention is configured in the aforesaid manner, the present invention can perform easily and safely the adjusting procedure of the clearance between the bladed edges of the respective plate-shaped blades disposed at the rotation blade and the blade edge of the fixed blade.

What is claimed is:

1. A strand cutting apparatus comprising:
   a fixed blade having a blade edge extending perpendicularly with respect to a traveling direction of a strand;
   a supporting member opposing to one side of said fixed blade with a clearance therebetween;
   a rotation shaft supported by said supporting member through a bearing mechanism so as to be freely rotatable and extending perpendicularly to said blade edge of said fixed blade;
   a disc-shaped rotation blade provided integrally at a tip end of said rotation shaft,
   a plurality of guide grooves provided radially on a front surface of said rotation blade opposing to said blade edge of said fixed blade, and
   plate-shaped blades respectively disposed in said guide grooves so that an amount of protrusion of each of blade edges of said plate-shaped blades is freely changed;
   guide means for guiding said supporting member to be movable freely and linearly along a same direction as a axial direction of said rotation shaft, said rotation blade integrally provided at a tip end of said rotation shaft being linearly moved together with said supporting member to said same direction as said axial direction of said rotation shaft so that a clearance between said blade edge of said fixed blade and said blade edges of said plate-shaped blades is to be adjusted.

2. A strand cutting apparatus according to claim 1, wherein said bearing mechanism is freely movable together with said rotation shaft along said axial direction of said rotation shaft relative to said supporting member only by a predetermined distance, and said bearing mechanism is biased by an elastic member toward said fixed blade.

3. A strand cutting apparatus according to claim 2, wherein said fixed blade has said blade edge protruding to said rotation blade side, and said blade edge is provided with a chamfered slanted surface at a side portion of an inner diameter side of said blade edge.

4. A strand cutting apparatus according to claim 1, wherein said fixed blade has said blade edge protruding to said rotation blade side, and said blade edge is provided with a chamfered slanted surface at a side portion of an inner diameter side of said blade edge.

5. A strand cutting apparatus according to claim 1 in combination with
   a blade edge adjusting jig for adjusting said clearance between said blade edge of said fixed blade and said blade edges of said plate-shaped blades, said blade edge adjusting jig being placed on a pedestal at which said fixed blade is attached, said blade edge adjusting jig comprising:
   a wall surface with such a height that an entire length of each of said blade edges of said plate-shaped blades extends to the entire height; and
   a surface provided at a rear side of said wall surface so as to be in parallel to said wall surface and having a uniform thickness and against which said blade edge of said fixed blade abuts.

6. A strand cutting apparatus according to claim 5, wherein said bearing mechanism is freely movable together with said rotation shaft along said axial direction of said rotation shaft relative to said supporting member only by a predetermined distance, and said bearing mechanism is biased by an elastic member toward said fixed blade.

7. A strand cutting apparatus according to claims 6, wherein said fixed blade has said blade edge protruding to said rotation blade side, and said blade edge is provided with a chamfered slanted surface at a side portion of an inner diameter side of said blade edge.

8. A strand cutting apparatus according to claim 5, wherein said fixed blade has said blade edge protruding to said rotation blade side, and said blade edge is provided with a chamfered slanted surface at a side portion of an inner diameter side of said blade edge.

9. A strand cutting apparatus according to claim 5, wherein said rotation blade is provided with guide grooves which are extended radially and arranged with a constant interval from one another, and each of said plate-shaped blades is attached to one slanted surface of corresponding one of said guide grooves by means of fastening bolts so that said each of said plate-shaped blades slips down along said slanted surface due to dead weight of said plate-shaped blade.

10. A strand cutting apparatus according to claim 9, wherein said fixed blade has said blade edge protruding to said rotation blade side, and said blade edge is provided with a chamfered slanted surface at a side portion of an inner diameter side of said blade edge.

11. A strand cutting apparatus according to claim 9, wherein said bearing mechanism is freely movable together with said rotation shaft along said axial direction of rotation shaft relative to said supporting member only by a predetermined distance, and said bearing mechanism is biased by an elastic member toward said fixed blade.

12. A strand cutting apparatus according to claim 11, wherein said fixed blade has said blade edge protruding to said rotation blade side, and said blade edge is provided with a chamfered slanted surface formed at a side portion of an inner diameter side of said blade edge.

13. A strand cutting apparatus according to any one of claims 1 to 12, wherein each of said plurality of plate-shaped blades is disposed in a manner that said plate-shaped blade firstly crosses at an inner diameter side of said blade edge thereof with said blade edge of said fixed blade in accordance with rotation of said rotation blade to form an angle within a range of 2 to 15 degrees between said blade edge of said plate-shaped blade and said blade edge of said fixed blade.

* * * * *